(12) United States Patent
Xu et al.

(10) Patent No.: US 8,146,061 B2
(45) Date of Patent: Mar. 27, 2012

(54) SYSTEMS AND METHODS FOR GRAPHICS HARDWARE DESIGN DEBUGGING AND VERIFICATION

(75) Inventors: Jim Xu, San Jose, CA (US); Minjie Huang, Shanghai (CN); Dong Zhou, Shanghai (CN)

(73) Assignee: Via Technologies, Inc., Taipei (TW)

( * ) Notice: Subject to any disclaimer, the term of this patent is extended or adjusted under 35 U.S.C. 154(b) by 1139 days.

(21) Appl. No.: 11/954,683

(22) Filed: Dec. 12, 2007

(65) Prior Publication Data

US 2009/0158257 A1    Jun. 18, 2009

(51) Int. Cl.
*G06F 9/44* (2006.01)
(52) U.S. Cl. .................. 717/135; 714/38.1; 345/501
(58) Field of Classification Search .................. 717/135
See application file for complete search history.

(56) References Cited

U.S. PATENT DOCUMENTS

| | | | | |
|---|---|---|---|---|
| 5,745,762 | A * | 4/1998 | Celi et al. ................. | 719/323 |
| 6,581,191 | B1 * | 6/2003 | Schubert et al. ........... | 716/136 |
| 7,027,972 | B1 | 4/2006 | Lee | |
| 7,093,165 | B2 * | 8/2006 | Kageshima ............... | 714/34 |
| 7,158,924 | B2 * | 1/2007 | Williams et al. .......... | 703/17 |
| 7,206,732 | B2 * | 4/2007 | Williams et al. .......... | 703/22 |
| 7,444,574 | B2 * | 10/2008 | Davis et al. ............... | 714/741 |
| 7,509,246 | B1 * | 3/2009 | Molson et al. ............. | 703/13 |
| 7,747,984 | B2 * | 6/2010 | Hsu ........................... | 717/124 |
| 2005/0066305 | A1 * | 3/2005 | Lisanke ..................... | 717/104 |
| 2006/0132480 | A1 * | 6/2006 | Muller ....................... | 345/418 |
| 2006/0274072 | A1 * | 12/2006 | Bhatia ........................ | 345/501 |

FOREIGN PATENT DOCUMENTS

| | | |
|---|---|---|
| TW | 200521769 | 7/2005 |
| TW | 200712810 | 4/2007 |

OTHER PUBLICATIONS

ModelSim: Advanced Verification and Debugging, Xilinx Tutorial Version 6.0a (Sep. 24, 2004).*
Rittman, D., Hardware/Software Co-verification & Co-Simulation (Dec. 2004).*
Schumacher, et al., A Software/Hardware PLatform for Rapid Prototyping of Video and Multimedia Designs, IDEAS'05 (2005).*
Duca, et al., A Relational Debugging Engine for the Graphics Pipeline, ACM (2006).*
English language translation of abstract of CN 1855855 (published Nov. 1, 2006).
English language translation of abstract of CN 101008915 (published Aug. 1, 2007).
English language translation of abstract of CN 101008962 (published Aug. 4, 2007).
Notice from Taiwan Patent Office received May 16, 2011.

* cited by examiner

*Primary Examiner* — Wei Zhen
*Assistant Examiner* — Kevin Dothager
(74) *Attorney, Agent, or Firm* — Thomas, Kayden, Horstemeyer & Risley, LLP

(57) ABSTRACT

Disclosed are systems and methods for debugging and analyzing graphics hardware designs. Hardware designs are represented by a software model implemented in a programming language. Graphics operations can be executed in the software model as well as in reference software models to allow a user to analyze the accuracy of a graphics hardware design and/or a device driver implementation.

17 Claims, 8 Drawing Sheets

SYSTEMS AND METHODS FOR GRAPHICS HARDWARE DESIGN DEBUGGING AND VERIFICATION

TECHNICAL FIELD

The present invention generally relates to graphics hardware, and, more specifically, to systems and methods for debugging and verifying a graphics hardware design using software models representing the hardware design.

BACKGROUND

Integrated circuit (IC) design typically involves several stages, each using a different tool of suite of tools. An IC designer typically writes code in one of several programming languages. Concurrent with the code-writing process is simulation, in which the designer runs a simulator tool to test the design, using the program code as input. As simulation reveals problems, the designer edits the code to fix problems, and simulates again. After simulation, a synthesizer translates the code into a logical representation of an IC. Other IC tools then transform this logical representation into a physical IC, in the form of a Field Programmable Gate Array (FPGA), Application-Specific Integrated Circuit (ASIC), or custom silicon IC.

Several types of programming languages are available to an IC designer. One family of languages can be described as Hardware Design Languages (HDL), also known as Register Transfer Languages (RTLs). Commonly known RTLs include Verilog and VHDL. RTLs are considered to be "low-level" because they describe hardware-specific features such as timing and parallelism. Another choice for IC design includes languages such as C and C++ (and variants thereof) that were traditionally used to develop software rather than hardware. These software languages allow the designer to write code at a much higher level of abstraction, which can increase designer productivity.

However, as many prevalent simulation and synthesis tools use HDL as input, rather than C/C++, an IC designer may choose to write code in C/C++ and translate the code into HDL. The translation can be done manually, automatically, or using a combination of both techniques. Further, simulation and synthesis tools using HDL as input often may not offer robust debugging capabilities to allow a hardware designer to easily and effectively debug a hardware design. For example, such simulation and synthesis tools typically allow a hardware designer or tester to examine data dumped and extracted from the simulation and synthesis tool, but they typically do not allow for more granular or detailed debugging operations and testing of graphics hardware designs.

SUMMARY OF THE INVENTION

An embodiment of the present invention may be described as a system for verifying a graphics hardware design. The system may include a script engine configured to translate a script representing graphics functions into commands processed by a software graphics driver. The software graphics driver processes the commands within a graphics processing model. The graphics processing unit model may correspond to a graphics processing unit hardware design and may be configured to generate at least one graphics frame corresponding to graphics functions within the script.

The system may also include a script engine configured to execute the commands within the software graphics driver and the graphics processing model. The script engine can be configured to display the at least one graphics frame and generate debugging information from the graphics processing model. The system may also include a debugger configured to allow for debugging capabilities of the graphics processing model.

Another embodiment may be described as a method of verifying a graphics hardware design. The method may include the step of translating a script representing graphics functions into commands processed by a software graphics driver. The method may also include the step of processing the commands within the software graphics driver and a graphics processing unit model representing a graphics hardware design. The method may also include the step of generating at least one frame corresponding to the graphics functions within the script.

Another embodiment may be described as a computer readable medium having a program for analyzing a graphics hardware design. The embodiment may include logic for translating a script into commands processed by a software graphics driver, logic for processing the commands within the software graphics driver and a graphics processing unit model representing the graphics hardware design, and logic for generating at least one frame corresponding to graphics functions within the script.

Other systems, methods, features and/or advantages will be or may become apparent to one with skill in the art upon examination of the following drawings and detailed description. It is intended that all such additional systems, methods, features and/or advantages be included within this description and be protected by the accompanying claims.

DETAILED DESCRIPTION OF THE DRAWINGS

Figure 1:
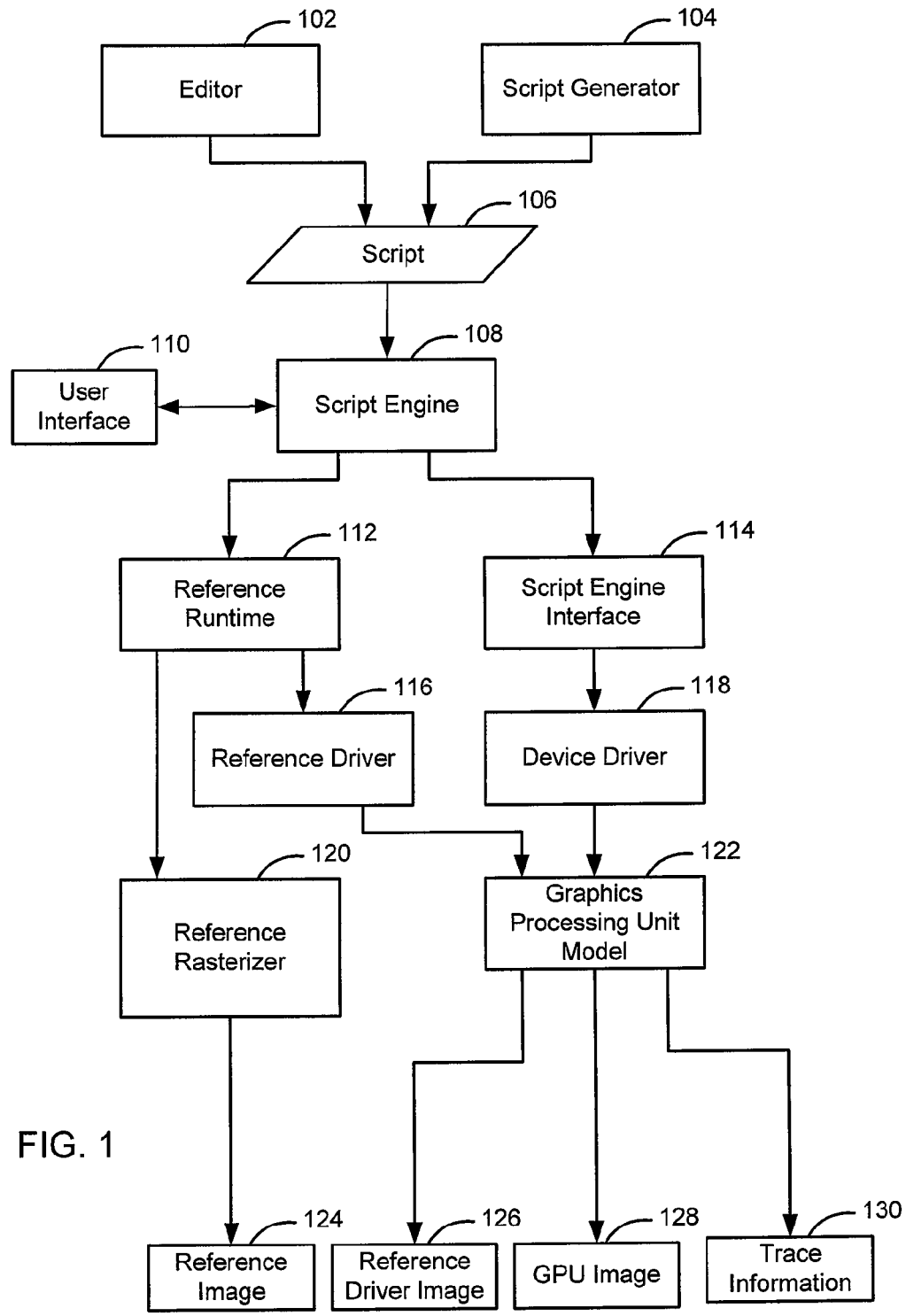
FIG. 1 is a functional block diagram of an embodiment of the disclosure.

Reference is now made in detail to the description of the embodiments as illustrated in the drawings. While several embodiments are described in connection with these drawings, there is no intent to limit the disclosure to the embodiment or embodiments disclosed herein. On the contrary, the intent is to cover all alternatives, modifications, and equivalents. Disclosed herein are systems and methods for verifying a graphics hardware design. The systems and methods provide the ability for a graphics hardware designer or tester to perform stepwise execution of applications including graphics operations to analyze and locate potential flaws in a graphics hardware design. Further, a user of the disclosed systems and methods may also set breakpoints in a script representing a software application's graphical component to further analyze the graphics hardware design.

A user may also generate and analyze graphics or video frames utilizing at least three execution pathways to further verify and test a graphics hardware design. A user can generate a frame utilizing a reference runtime and a reference rasterizer; a reference runtime, a reference software device driver and the graphics hardware being tested; or a software device driver and the graphics hardware being tested. The at least three testing pathways can allow a user to analyze and test the graphics hardware design as well as a software device driver written to support the graphics hardware. A user may utilize a single script and execute the script utilizing multiple execution pathways simultaneously and analyze resultant video or graphics frames.

Reference is now made to FIG. 1, which depicts a functional block diagram of an exemplary system for verifying a graphics hardware design in accordance with embodiments of the invention. The depicted system includes an editor 102, which is an optional component of a system of the disclosure for creating a script 106 used for verifying a graphics hardware design. As an example, a user of the system wishing to verify or analyze a graphics hardware design can create a script 106 "by hand" that includes commands representing graphics operations, where the commands are defined by a script language.

Alternatively, a script 106 can be created by a script generator 104. A script generator 104 can log or capture graphics operations from a software application having a graphical component. For example, a software application utilizing the exemplary Direct3D® or OpenGL® graphics application programming interfaces may contain calls to a graphics runtime or graphics application programming interface which can be logged or captured and transformed into commands defined by a script language. In this manner a script 106 representing the graphics operations of a software application 210 (FIG. 2) such as a game or other application having a graphical component can be transformed into a script 106 which can be utilized within the depicted script engine 108. Scripts generated by the script generator 104 can be edited with the editor 102 so that a user of the system can add, remove or alter the script commands representing graphics operations. For example, a user of the system may wish to remove portions of a script 106 generated by the script generator 104 that the user determines are superfluous or unnecessary for the proper evaluation of a graphics hardware design.

Figure 2:
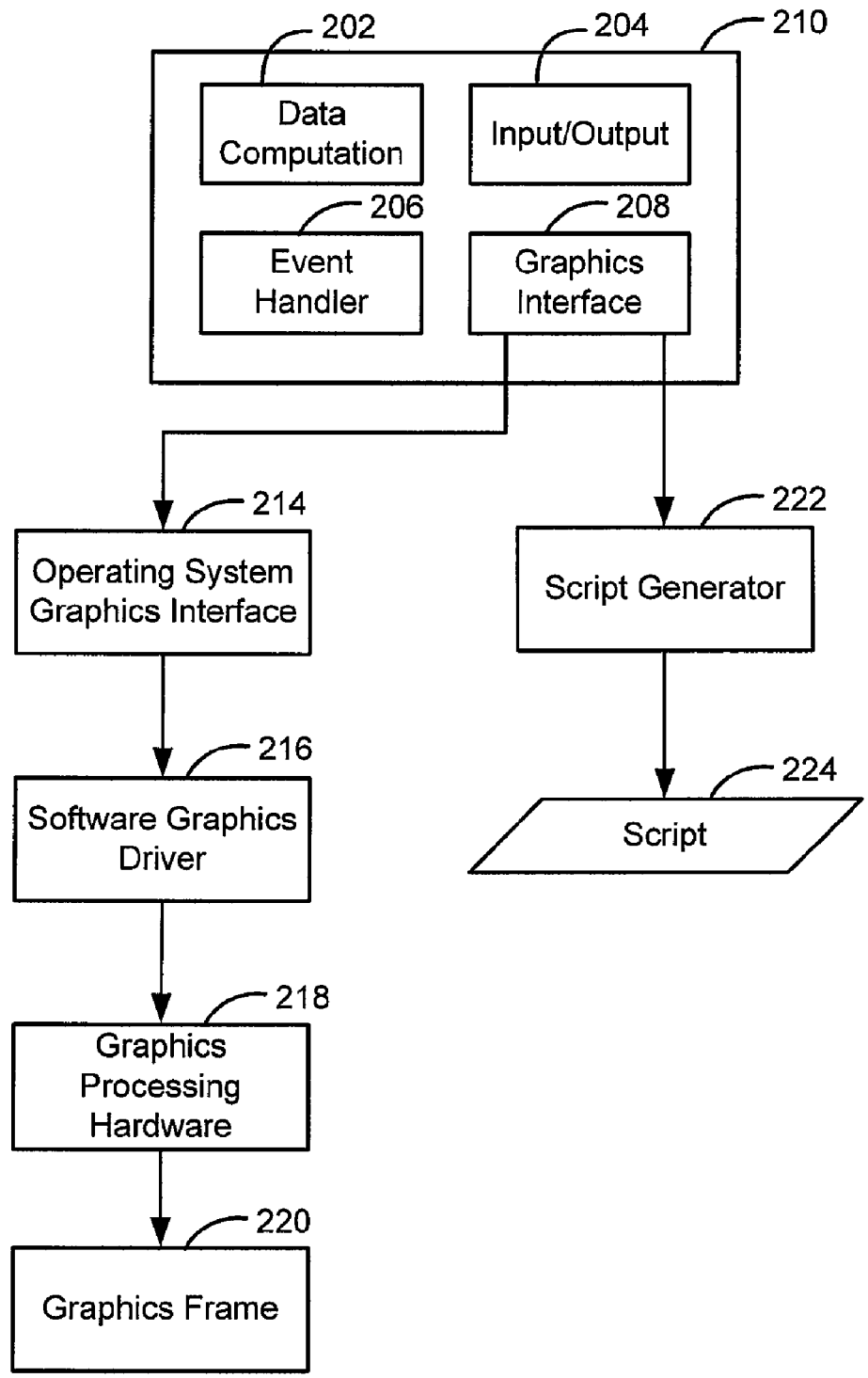
FIG. 2 is a functional block diagram of a script generator of an embodiment of the disclosure.

FIG. 2 depicts an exemplary software application 210 having a graphical or graphics interface 208 component. The depicted software application 210 also contains other exemplary modules, including data computation 202, event handler 206 and input/output 204; however, it should be appreciated that this is not an exhaustive list of possible modules within an exemplary software application and is but one example shown for clarity and ease of depiction. The software application 210, in order to display or generate graphics, may have a graphics interface 208 that communicates with an operating system graphics interface 214, or graphics application programming interface, in order to execute commands that will result in graphical output to a screen or display. The operating system graphics interface 214 can communicate with a software graphics driver 216. The software graphics driver 216 is equivalent with the device driver 118 (FIG. 1). It should be appreciated that a software graphics driver 216 is generally configured to interact with graphics processing hardware 218 to translate commands submitted to a standardized application programming interface into commands that may be unique to a certain graphics processing hardware.

Graphics processing hardware 218 receives commands from the software graphics driver 216 to process data and generate frames 220 of graphics or video for display to a screen or other similar output device. Graphics processing hardware designs can vary among manufacturers but typically, in conjunction with a software graphics driver 216, are able to execute commands defined by a standardized software application programming interface such as the Direct3D® API or OpenGL® API.

The script generator 222 can capture or log commands from a software application 210 to generate graphics content or from an application's graphical component. The script generator 222 can convert such commands to commands in a script 224 defined by a script language. As a non-limiting example, script commands in a script language can be grouped into at least four groups of command types: common commands, 2D commands, 3D commands, and video commands. In this non-limiting example, the command groups have analogues in corresponding API functions of a software graphics API.

For example, common commands can include commands that define the version and type of graphics API utilized by the graphics operations, the display mode or resolution of the graphical operations, color quality or density and other attributes relevant to the generation of a graphics or video frame that should be appreciated by a person of ordinary skill in the art. Further, common commands can also include commands defining one or more breakpoints within a script as well as commands directing the script engine to dump debugging information to a file, display or other output device. The debugging information can include information relevant to the debugging of a graphics hardware design.

Common commands can also include other additional commands useful for debugging purposes. For example, commands to jump to another point in a script may be useful for a user analyzing a hardware design. The usefulness of jump capabilities that maintain or discard the state of the rendering process should also be appreciated. An additional exemplary debugging command can include a command that causes a debugging message to be displayed or stored in a file. This may be useful for a user evaluating a graphics hardware design to alert the user of certain information he wishes to see during the execution of a script, or to merely alert the user that a certain portion of the script has been reached. Further, commands to clear D/Z/S buffers can be included. Additionally, a command that displays the rendered graphics or video frame or flips the frame can be included in the script language. It should be appreciated by a person of ordinary skill in the art that a D buffer is a buffer containing information pertaining to render target for color data. It is also referred to in the art as a destination buffer. It should also be appreciated that a Z buffer refers to a "depth" buffer where depth information of each pixel is stored. It should further be appreciated that an S buffer refers to a "stencil" buffer where a stencil value of each pixel is stored. These buffers are the major memory locations of a 3D rendering result. Additionally, script commands enabling the programming of low level hardware registers in a graphics processing unit can provide control of detailed functions inside a GPU or a model representing a GPU.

2D commands, 3D commands, and video commands can include those commands that have analogues within a particular graphics application programming interface, such as the Direct3D® API or OpenGL® API. It should be appreciated that the above mentioned commands may vary depending on the particular graphics API utilized by the software application or the graphics hardware design utilized by the script engine; however, those of ordinary skill in the art and with knowledge of graphics API's should recognize these potential variations.

Reference will now return to the functional block diagram of FIG. 1. As previously noted, the depicted system utilizes a script that can be created by either an editor 102 or a script generator 104. The script 106 contains commands corresponding to graphics operations that are defined by a script language. The script 106 can be executed by a script engine 108, which can offer a user of the system various alternative execution pathways for the verification and analysis of a graphics hardware design. The various execution pathways can allow a user to utilize the graphics hardware design that the user is testing as well as reference systems in order to generate frames of graphics or video for comparison. The script engine 108 interprets a script 106 from commands representing graphical operations defined by a script language to commands executed by the script engine 108 to generate graphics frames as well as allow a user of the system to analyze and debug a graphics hardware design utilized for the generation of the frames.

The script engine 108 can also include a user interface 110 to allow a user to visually interact with and/or control the script engine via a keyboard, mouse or other input device as well as a display or other output device. The user interface 110 also allows the script engine 108 to display the results of at least one of the execution pathways to the user. The user interface 110 can further allow a user to compare the results of at least two execution pathways in analyzing a graphics hardware design.

The depicted system may further include a script engine interface 114 that allows the script engine 108 to execute a script 106 represented in a script language within a graphics hardware design via a graphics device driver 118. In other words, the script engine interface 114 can translate script commands 106 to a format that can be processed by a device driver 118, as translation may be required from the script containing commands defined by a script language to device driver calls and subsequent calls within a graphics processing unit or a model representing a graphics processing unit. The implementation of the script engine interface 114 may vary depending on the device driver 118 and graphics processing unit model 122 utilized with the depicted system, as the system can be configured to execute a script with varying device drivers and models according to their communications protocols.

The depicted system may include a graphics processing unit model 122. The graphics processing unit model 122 may be a software model representing a hardware design of a graphics processing unit, which may allow a designer or tester to analyze and verify a particular hardware design without producing a physical GPU unit for testing. As noted above, hardware designers may create a graphics hardware design using a hardware description language. It should be appreciated that a hardware design represented in a hardware description language can be translated into a model of the design utilizing a programming language such as C or other similar languages allowing a designer to create working software models of a hardware design. Such models can be utilized within the framework of the depicted system to create a working graphics system that can generate graphics or video frames for testing and verification purposes.

For example, it is known that the logic gates described by an HDL design can be translated into a language such as C to create a model of the hardware design that can be utilized for modeling and testing purposes. Such models can be known in the art as "C-models" to describe the programming language used to create a usable model of the graphics hardware design. It is further known that device drivers are typically software components that facilitate communication between an operating system's graphics subsystem and graphics hardware. In the depicted system the device driver 118 may also be analyzed and verified by interacting with the script engine interface 114 and the graphics processing unit model 122.

Because the graphics processing unit model 122 simulates a functioning hardware graphics processing unit, it can generate graphics or video frames or GPU images 128 that can be displayed to a user via the user interface 110. In other words, the graphics processing unit model 122 can generate a GPU image 128 representing the commands in the script 106 and executed by the script engine 108 in the graphics processing unit model 122 via the script engine interface 114 and device driver 118. The GPU image 128 can be analyzed by a user of the depicted system via the user interface 110 or through the use of other tools. Further, the user interface 110 can be configured to zoom and analyze in further detail certain aspects of the generated image. A user of the depicted system can analyze the generated GPU image 128 to test or verify a graphics hardware design represented by the graphics processing unit model 122 that is translated from an HDL design.

Further, because the graphics processing unit model 122 is represented in a programming language such as C, a person of ordinary skill in the art would appreciate that trace information or other debugging data can be generated during the execution of a script and captured for analysis. In particular, data revealing the utilization of data within certain components of a hardware design can be captured and analyzed during the testing and verification of a design that may prove useful for debugging purposes. In addition, a user of the system may elect to display certain trace information via the user interface 110.

The depicted system includes a reference runtime 112, which communicates with the script engine 108 and receives commands from the script engine for the processing of script commands. A user of the depicted system may elect to execute a script utilizing a reference runtime 112, which can include, as a non-limiting example, a software vendor provided runtime such as the Direct3D® runtime. The system further includes a reference driver 116, which is a reference software driver that can be created as a prototype of a production graphics driver.

It should be appreciated that a reference driver 116 can be created to act as an interface between an application and a model representing a hardware design and to also verify features defined in a graphics specification. Additionally, a reference driver may provide a baseline for performance analysis or profile a performance target for a graphics hardware design. The reference driver 116 can communicate with the graphics processing unit model 122 and cause the model to generate reference driver images 126 or reference driver frames which correspond to commands in the script 106 and generated by the graphics processing unit model 122 under the direction of the script engine 108, reference runtime 112 and reference driver 116. In this way, a user of the system may analyze and verify the design of a device driver 118 by utilizing a reference driver to generate video or graphics frames with the same hardware design.

A user may also analyze trace information 130 generated as a result of the generated reference driver image 126 as well as cause the image 126 and trace information 130 to be displayed via the user interface 110. The user may also compare the reference driver image 126 and GPU image 128 as well as zoom, rotate or otherwise manipulate both images via the user interface 110 to test and verify the design of a device driver and graphics hardware design by analyzing images generated by the system.

The depicted system also includes a reference rasterizer 120 that can render video or audio frames, or render a reference image 124 based on commands in the script 106 and communicated to the reference rasterizer 120 via the reference runtime 112. The reference rasterizer 120 can be provided by a software vendor or creator of a graphics application programming interface such as the Direct3D® or OpenGL® graphics API's as a reference tool for graphics hardware designers. A reference rasterizer 120 can also be created independently as a reference implementation of functions of a graphics API. The reference rasterizer 120 is typically a tool implemented in software to simulate a reference hardware implementation, but typically does not possess the necessary performance characteristics desired in the market nor does it translate into an implementable hardware design. The reference rasterizer 120 can generate a reference image 124 based on commands in the script 106 and communicated via the reference runtime 112. A user may wish to view the reference image via the user interface 110 or compare the reference image 124 to the reference driver image 126 or GPU image 128 to analyze and verify a hardware design or device driver implementation.

Figure 3:
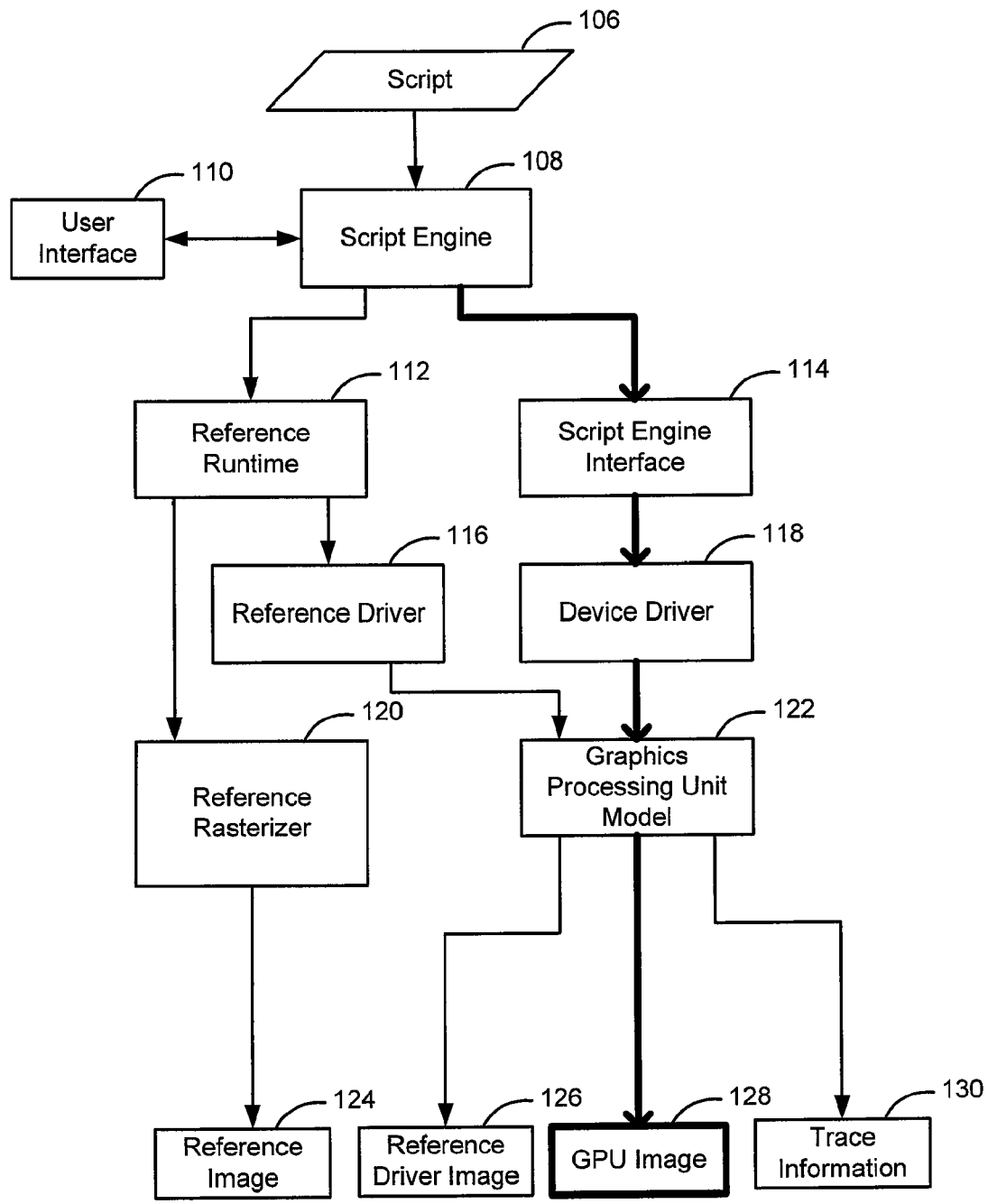
FIG. 3 is a functional block diagram of the embodiment of FIG. 1 with a highlighted execution pathway.

The depicted system offers at least three execution pathways for the execution of a script. The various execution pathways may be chosen by a user via the user interface or by commands embedded in a script. The various execution pathways may be executed in parallel so that a user may compare generated images side by side via a user interface or by analyzing trace information. Reference is now made to FIG. 3, which depicts a functional block diagram of a system of the disclosure with one of the possible execution pathways highlighted. The highlighted execution pathway is one example of an iteration of the depicted system's execution. It should be appreciated that multiple iterations of the execution pathway may be desirable to analyze, test or verify a graphics hardware design represented by the graphics processing unit model.

The highlighted execution pathway illustrates a pathway for the depicted system to execute a script via the script engine 108 within a device driver 118 and a graphics processing unit model 122 representing a hardware design that the user of the system may wish to analyze or verify. As noted above, hardware designs are typically conceived in an HDL, and often in a higher level programming language such as C. Designs represented in an HDL can typically be translated into a higher language such as C. Such a representation of the hardware design can be utilized within the system as the graphics processing unit model. A user of the system may also wish to test or analyze the design of a device driver written to assist a computer operating system's interaction with graphics hardware.

The highlighted execution pathway illustrates a pathway including a device driver and a hardware design embodied in the GPU model that can be evaluated and tested. Trace information 130 can also be generated for further analysis of various aspects of the model and device driver. The highlighted image is generated as a result of an iteration of the system executing a script within the script engine interface 114, the device driver 118, and the graphics processing unit model 122 representing a hardware design of a graphics processing hardware system. The image generated by the system can represent a graphics or video frame, and can be analyzed, zoomed and manipulated by a user via the user interface 110 so that the user may analyze, verify or debug a graphics hardware design represented by the graphics processing unit model 122. The system may also complete multiple iterations of the generation of images to create moving graphics and video for analysis by the user of the system via the user interface 110.

Figure 4:
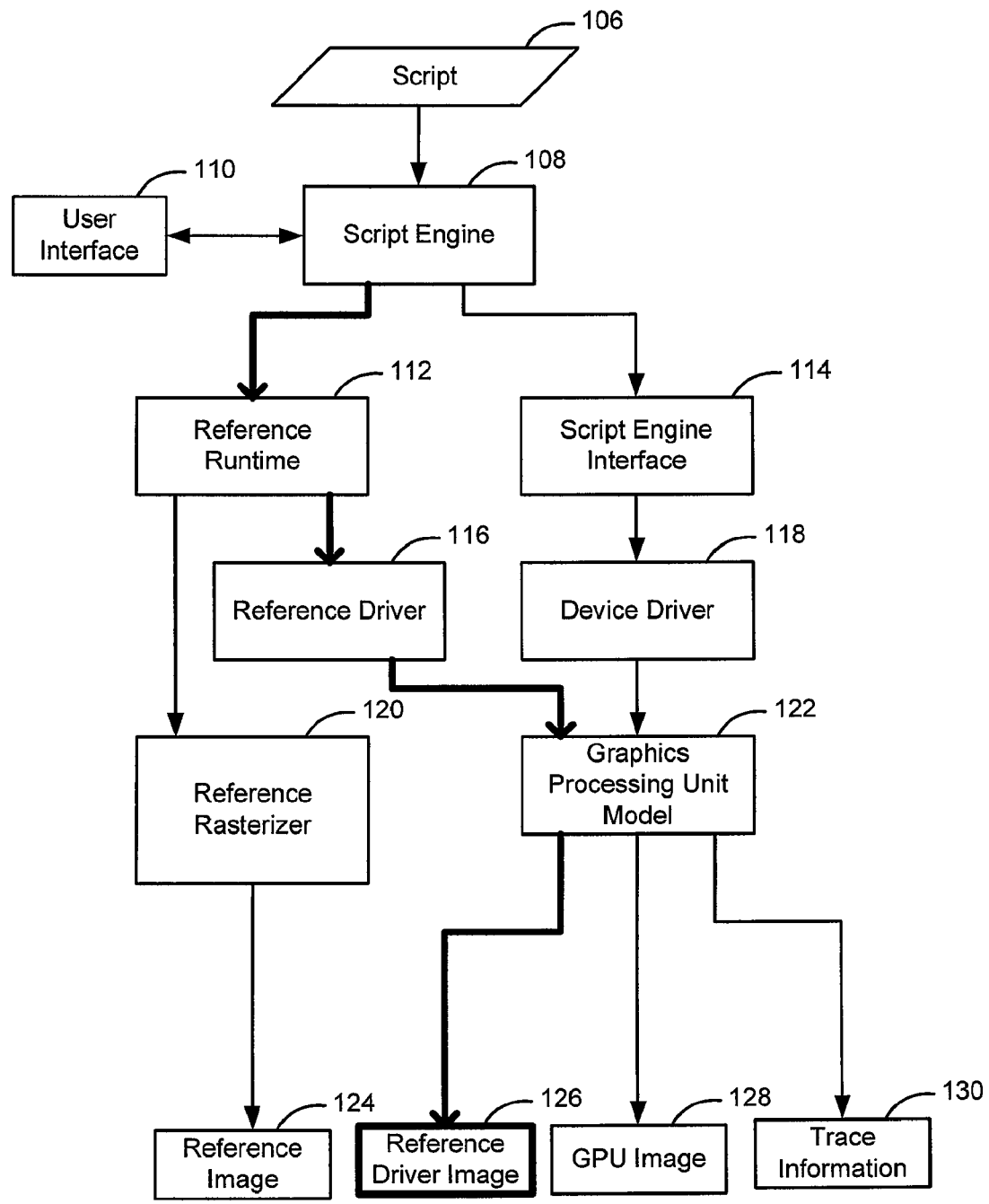
FIG. 4 is a functional block diagram of the embodiment of FIG. 1 with an alternative highlighted execution pathway.

Reference is now made to FIG. 4, which illustrates an alternative execution pathway of the depicted system. The highlighted execution pathway offers a user of the system the ability to generate a reference driver image 126, which represents a graphics or video frame generated using a reference device driver 116 in combination with the graphics processing unit model 122 representing a hardware design. In this way, the user of the system may verify or analyze the device driver by comparing images generated utilizing the device driver 118 as well as the reference device driver 116. As noted above, the reference device driver 116 may be created by a software vendor providing a graphics API such as the Direct3D® API or by a third party implementing a driver that operates according to a reference specification that may not take advantage of a hardware design as efficiently as a hardware specific device driver developed by a hardware vendor.

The reference driver image 126 generated as a result of an iteration of the system may be compared to an image generated as a result of the execution pathway of FIG. 3 via the user interface 110. For example, the reference driver image 126 and image can be zoomed, rotated or otherwise manipulated so that a user may analyze the accuracy of each generate generated image. Further analysis may be undertaken on the generated images to verify and analyze a hardware design as well as a software device driver design and implementation. The highlighted execution pathway allows a user of the system to analyze a hardware design represented by the graphics processing unit model 122 by executing a script 106 utilizing a reference driver 116 as well as a device driver 118 developed for use and/or distribution with graphics hardware produced in accordance with the design being tested.

Figure 5:
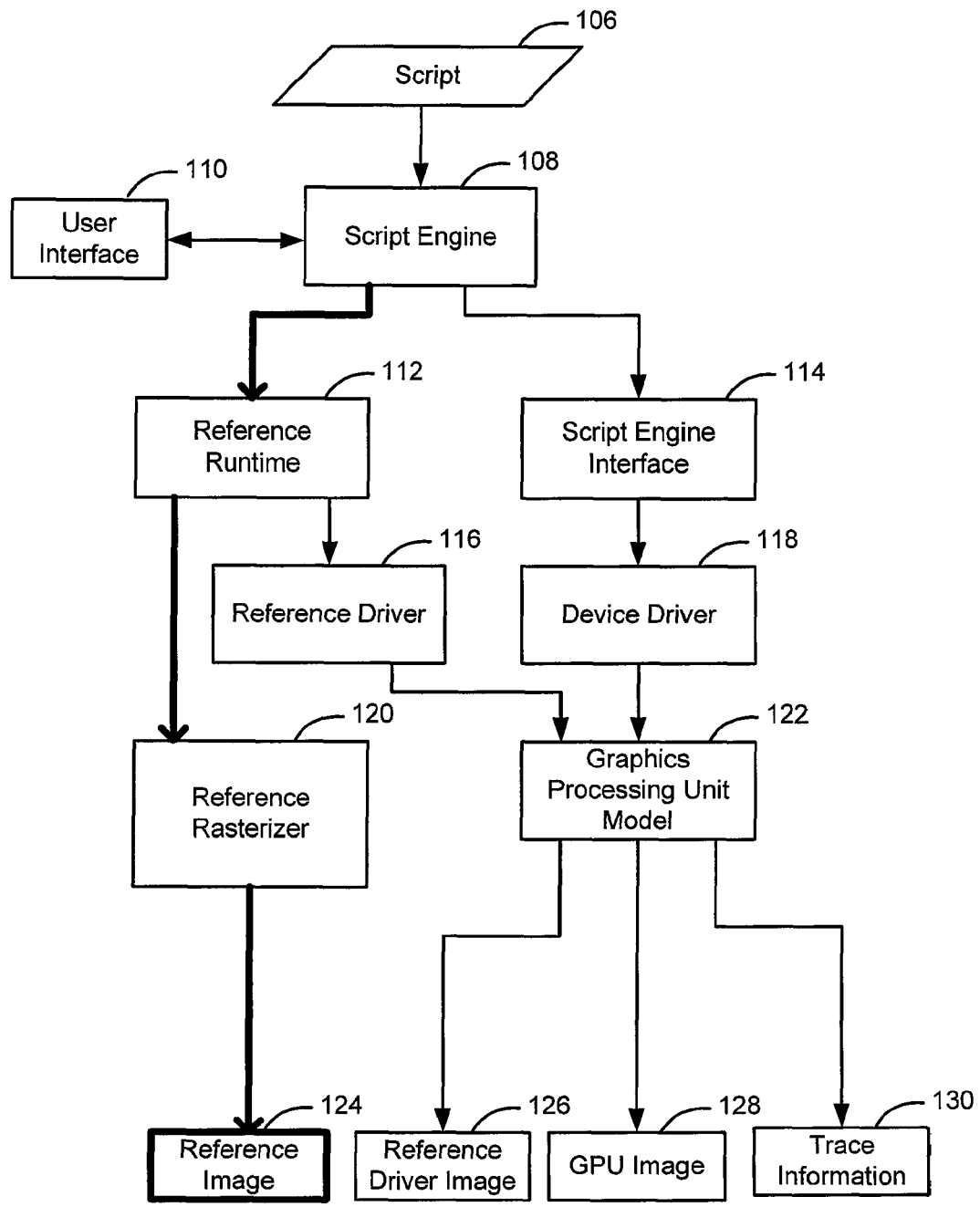
FIG. 5 is a functional block diagram of the embodiment of FIG. 1 with an alternative highlighted execution pathway.

Reference is now made to FIG. 5, which illustrates an additional alternative execution pathway of the depicted system. The highlighted execution pathway allows a user to generate a reference image 124 utilizing a reference runtime 112. As noted above, it should be appreciated that the reference runtime 112 can represent a runtime provided by a software vendor providing a graphics API such as the Direct3D® API. The reference runtime 112 may then communicate with a reference rasterizer 120, which can generate frames of video or graphics in the form of a reference image. It should also be appreciated that, as noted above the reference rasterizer 120 can be implemented to perform graphics operations according to a graphics API to provide a reference, or baseline, for comparison purposes to assist in the ensuring of the accuracy of a hardware design or a software device driver.

The reference image 124 represents a video or graphics frame generated utilizing only reference implementations of a graphics API and a reference rasterizer 120 representing reference graphics hardware. The reference image 124 can be compared to a reference driver image 126 or an image via the user interface 110, which can be useful for a user of the system to evaluate a device driver 118 or a hardware design represented by the graphics processing unit model 122. For example, the reference image 124 can be zoomed, rotated or otherwise manipulated within the user interface 110 as well as compared to a reference driver image 126 or an image to assist a user in verifying and analyzing a graphics hardware design.

Figure 6:
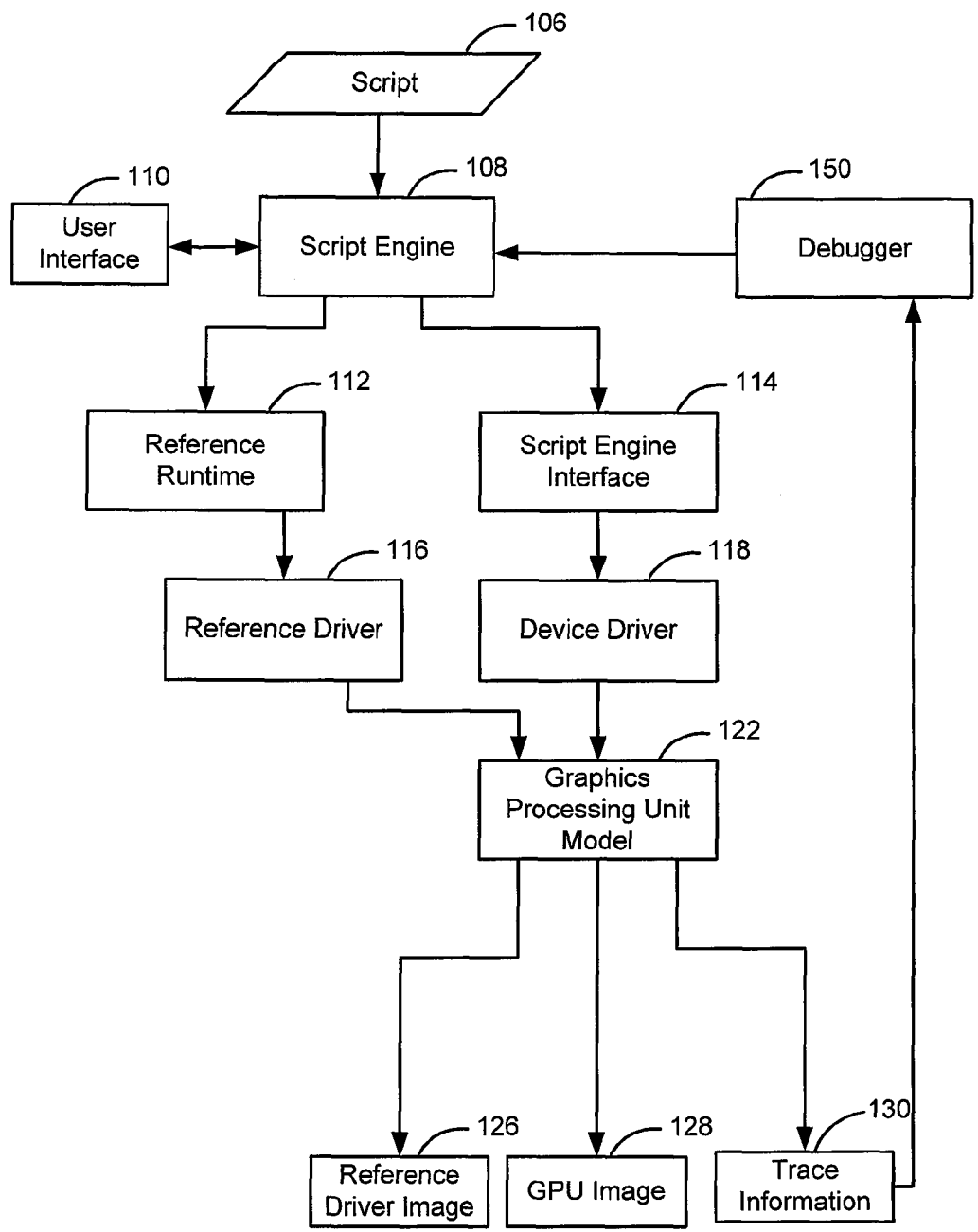
FIG. 6 is a functional block diagram of an alternative embodiment of the disclosure.

Reference is now made to FIG. 6, which illustrates an embodiment of the disclosure that includes a debugger 150 providing additional functionality for a user of the system. The debugger 150 can offer debugging capabilities that allow a user of the depicted system to further interact with or control the execution of a script 106 within the script engine 108. For example, the debugger 150 can interact with the script engine 108 to offer control over the execution of a script 106 to a user of the system. For example, the debugger 150 can allow a user to perform stepwise execution of the script 106 while highlighting or otherwise denoting a current location in the script during execution via the user interface 110. It should be appreciated that, although not specifically illustrated in the other figures, the similar debugger 150 may be included and interfaced with the script engine 108 of the other illustrated embodiments.

Further, via the user interface 110, a user may control stepwise execution of the script 106 via the user interface 110. A user may choose to continue uninterrupted execution of the script 106 or continue stepwise execution of the script 106 in his or her analysis of the script 106 as well as hardware designs or device drivers utilized by the script 106. For example, if a script 106 utilizing the graphics processing unit model 122 or device driver 118 causes frames not conforming to an expected result, a user may utilize the debugger 150 to determine which script commands, if any, cause such a failure. In this way, a user may better understand which parts, if any, of a hardware design or device driver 118 cause the failure.

Further, the debugger 150, via the user interface 110, can allow a user to place or set breakpoints within a script 106. It should be appreciated that a breakpoint allows a user to cause a script 106 executed within the script engine 108 to pause or stop when a breakpoint within a script 106 is reached. Breakpoint functionality can be useful in the analysis of a hardware design represented by a graphics processing unit model 122 or a device driver 118 utilized within a particular chosen execution pathway. Further, the debugger 150 may present trace information 130 generated by the graphics processing unit model 122 to the user via the user interface 110. Trace information 130 can include data being input to the graphics processing unit model 122 as well as data generated by the model. The debugger 150 and/or user interface 110 can present the trace information 130 and allow for advanced functionality such as sorting, searching, variable tracking, variable manipulation and other debugging functionality that should be appreciated. It should further be appreciated that stepwise execution of a script, breakpoints, and views into the trace information offered to a user of the system by the debugger 150 and user interface 110 can allow a user to analyze or verify designs of a graphics processing unit with greater granularity relative to building a hardware GPU and testing it using methods known in the art.

Figure 7:
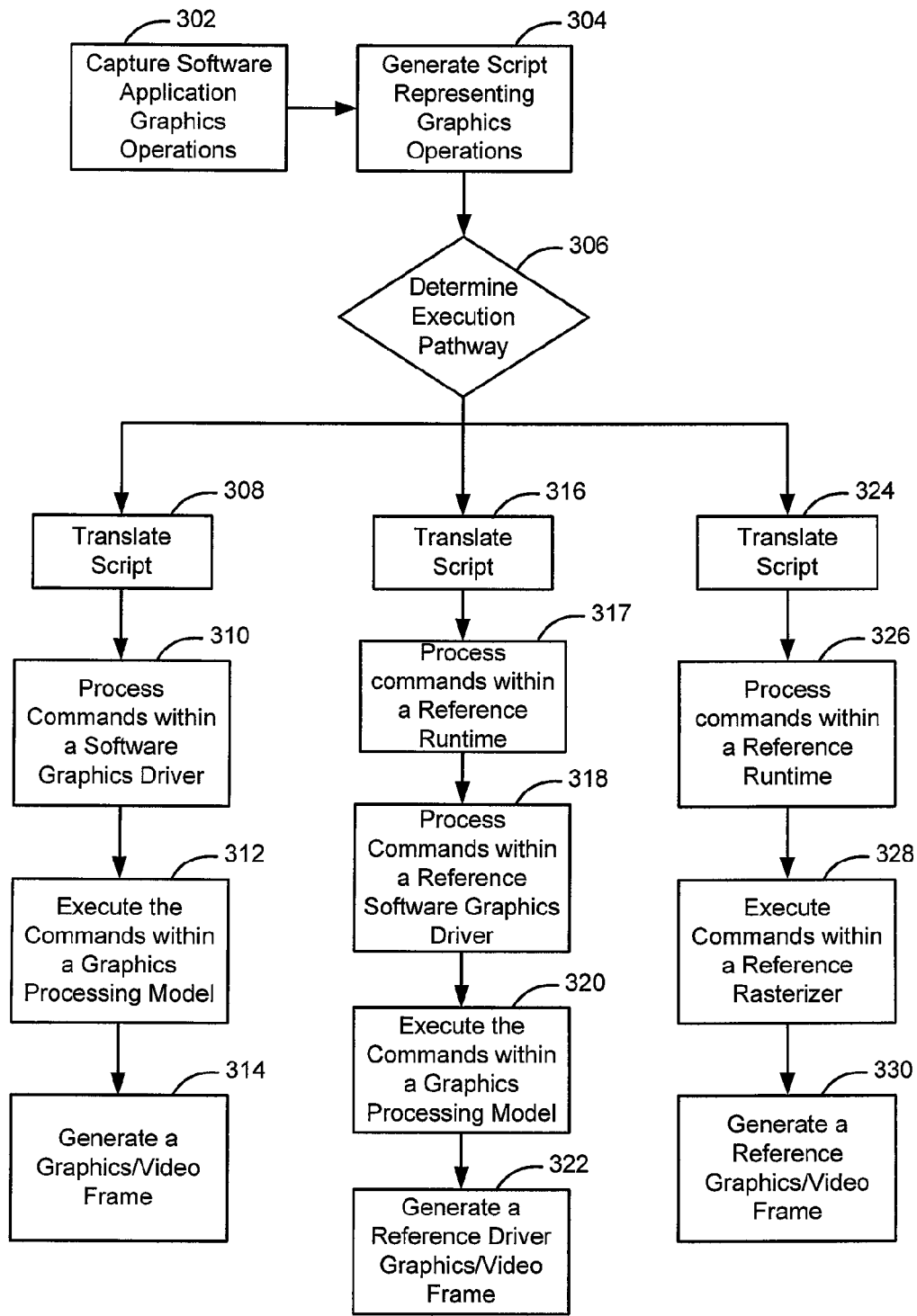
FIG. 7 is a flowchart diagram of a method embodiment of the disclosure.

Reference is now made to FIG. 7, which depicts a flowchart of a method according to the disclosure. In step 302, graphics operations in a software application 210 are captured in order to generate a script in an automated way. For example, a software application 210 may make requests to a graphics API within an operating system in order to generate frames of graphics or video. These requests can be captured in order to generate a script processed by a script engine as described above. In step 304 the captured graphics operations are translated into a script 106 containing script commands defined by a script language. As a non-limiting example, script commands can be separated into four categories: common commands, 2D commands, 3D commands, and video commands. In step 304, a script is generated from the captured graphics commands. The script 106 includes script commands defined by a script language as noted above. The script 106 includes commands that correspond to the graphics operations captured from a software application 210 including a graphical component. For example, a series of graphical operations within a software application 210 for drawing 3D objects can be captured and represented by a script that may be executed within various execution pathways. Or, alternatively, a script 106 including script commands for generating graphics or video frames can be manually created by a user.

In step 306, an execution pathway in which to execute the script 106 is determined. As noted above in reference to the embodiment of FIGS. 1-6, multiple execution pathways are available for a user of systems and methods of the disclosure for the analysis and verification of a hardware design and/or device driver implementation. For example, a user may choose to execute a script within the execution pathway beginning with step 308, which includes the translation of the script 106. The commands defined by a script language located within the script are translated into a format that can be processed by a software device driver 216. As noted above, a script 106 contains script commands defined by a script language, which may not be in a format that is understandable by a device driver. Therefore, the script commands are translated into a format typically generated by a operating system's graphical calls made in response to functions executed within a graphics API, such as the Direct3D® or OpenGL® graphics API's.

In step 310, the commands are processed with software graphics driver 216, or a device driver 118. As is known a device driver 118 is a software component allowing an operating system or other software application 210 to interface with a hardware component such as a graphics process unit, which may or may not have standardized communications protocols known by the operating system used for interfacing with the hardware component and executing operations within the component. In step 312, the commands processed by the software graphics driver 216 are executed within a graphics processing unit model. As noted above a graphics processing unit model can be a software model of a graphics hardware design that allows a user analyzing or verifying a hardware design to interact with a software model rather than a hardware prototype or hardware GPU. It should be appreciated that such a model can be implemented in C or other programming languages by translating a hardware design written in a hardware description language (HDL) into a high level programming language such as C. Alternatively, some hardware designers implement hardware designs in a language such as C and no translation is necessary. It should further be appreciated that utilizing such C-models allow for the creation of working software models of a hardware design. They allow for easier manipulation of the model relative to a hardware design represented by a HDL when, for example, implementing debugging functionality is desired. Manipulating a model represented in a high level programming language for testing and analysis purposes is far easier relative to a model represented by a HDL because of the flexibility the high level programming language offers.

In step 314 a graphics or video frame is generated by the graphics processing unit model representing the commands in the script 106 processed by the software driver 216 and executed by the graphics processing unit model. The generated graphics or video frame can be analyzed to evaluate a hardware design represented by the graphics processing unit model via a user interface 110 or other methods appreciated by a person of ordinary skill in the art. For example, a user may analyze whether the generated frame is consistent with an expected result from the script 106 executed by a script engine 108. A user may examine or manipulate the generated frame via a user interface 110 or compare the generated frame to a frame generated from an alternative execution pathway.

Step 316 depicts the beginning of an alternative execution pathway from the step of determining an execution pathway. The depicted pathway differs from the above noted pathway in that the commands translated from the script 106 in step 316 are processed within a reference runtime 112 in step 317. Subsequently, the commands are processed within a reference software driver 116 in step 318. As noted above in reference to embodiments disclosed above, a reference software driver 116 can be a software driver that may not necessarily take full advantage of a hardware design but is implemented according to a reference graphics API, such as the Direct3D® or OpenGL® graphics API's. In step 320, the commands processed by the reference software driver are executed within a graphics processing unit model representing a hardware design. This execution pathway can allow a user to execute a script 106 utilizing a graphics processing unit model and a reference software driver 116, expanding the testing and analysis possibilities for a user. A graphics or video frame is generated in step 322 from the commands in the script 106 processed by the reference software driver 116 and executed by the graphics processing unit model. Further, a user may compare frames generated in step 322 to frames generated in step 314 to analyze or verify a hardware design represented by the graphics processing unit model or the implementation of a software driver or device driver.

Step 324 depicts yet another alternative execution pathway available to a user for the testing or analysis of a graphics hardware design. This execution pathway allows a user to process commands of a script within a reference runtime 112 (step 326) and execute the commands within a reference rasterizer 120 (step 328). As noted above, a reference runtime 112 is a software component known in the art and typically provided by a software graphics API provider or implemented according to a reference specification. The commands processed by the reference runtime 112 are executed within a reference rasterizer 120 in step 328. As noted above in reference to above disclosed embodiments, the reference rasterizer 120 can generate video or graphics frames in step 330. A reference rasterizer 120, as is known in the art, is a software implementation of a reference graphics processing unit according to a graphics API such as the Direct3D® API that can be used to generate graphics or video frames according to a reference specification. Hardware vendors may use a reference rasterizer during the development of hardware as a baseline to which hardware designs and implementations can be compared for accuracy. This alternative execution pathway allows a user to compare frames generated in step 330 to frames generated in other execution pathways to analyze and verify hardware designs represented by a graphics processing unit model as well as software driver implementations.

Figure 8:
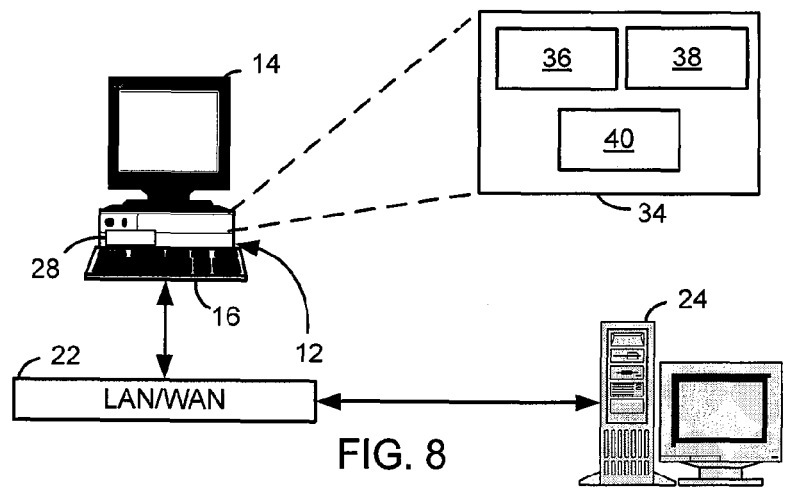
FIG. 8 is a diagram of an alternative embodiment of the disclosure.

Reference is now made to FIG. 8, which depicts a system for graphics hardware design debugging and verification including a computer system 12 having a display 14 and user input device 16, which may be a keyboard or a mouse, for example. Computer system 12 may also form a node on a network 22 such as, but not limited to a LAN or a WAN. In this configuration, scripts or graphics operations used for generating a script may be delivered from a remote server 24 over network 22 to computer system 12. The connection between the remote server 24 and computer system 12 may be any number of physical networking interfaces such as a CAT-5, Firewire, 802.11, wireless, as well as other connections. Computer system 12 may also include optical drive 28 to receive and read an optical disk, which may have scripts or software applications having graphics operations for the generating of a script stored thereon.

Computer system 12 includes memory 34 which may be used to store a number of executable modules therein. In this embodiment, a script translation module 36, script processing module 38, and frame generating module 40 are stored therein. Memory 34 may include a number of other modules which, for example, could be sub-modules of script translation module 36, script processing module 38, and frame generating module 40.

Script translation module 36 may translate a script containing graphical operations into a format that can be transmitted to a software driver or device driver configured to interact with graphics hardware or a software model representing a graphics hardware design. As noted above, a device driver can be a software component configured to facilitate communication between an operating system or other software application and a hardware component such as a hardware graphics processing unit. The script translation module 36 may operate differently depending on whether a script will be executed within a device driver, a reference driver, a reference runtime or other software components that interact with hardware or software models representing a hardware design or specification. For example, if graphical operations represented by a script are to be processed within a device driver, the script translation module 36 will translate script commands into a format for the device driver. Alternatively, if graphical operations represented by a script are to be processed within a reference runtime, the script translation module 36, will translate script commands into a format for the reference runtime.

Script processing module 38 can execute a script by causing translated script commands to be executed within a software driver or device driver. Script processing module 38 controls the execution of a script and can include debugging functionality to allow a user to utilize stepwise execution of the script as well as breakpoint functionality. For example, a user may set a breakpoint within a script and script processing module 38 may pause execution of the script at the set breakpoint, allowing a user to examine various data regarding script execution and continue execution of the script should the user desire.

Frame generating module 40 may generate graphics or video frames according to an execution pathway chosen by a user. Frame generating module can contain at least three execution pathways, which are discussed above in reference to above disclosed embodiments. For example, frame generating module 40 can contain a test execution pathway that utilizes a software driver or device driver and a software model representing a hardware design; a reference driver execution pathway that utilizes a reference device driver and the software model representing a hardware design; and a reference execution pathway utilizing a reference runtime and a reference rasterizer. These at least three execution pathways within the frame generating module 40 allow a user to analyze a hardware design represented by a software model as well as a software driver or device driver implementation. Frame generating module 40 may allow one or more execution pathways to be utilized in parallel so that a user may execute the same or similar script utilizing multiple execution pathways to compare generated frames resulting from the script execution. For example, a user may utilize the test execution pathway and the reference execution pathway in parallel to evaluate whether the hardware design and software driver implementation are producing desired results relative to frames generated by the reference execution pathway.

Note that in some embodiments, script translation module 36, script processing module 38, and frame generating module 40 may be combined into a single module that performs any combination of the tasks performed by each of the modules separately. Thus, any modules or submodules described herein are not limited to existing as separate modules. In reality all modules may operate apart from one another, or could easily be combined as one module. In some embodiments, a user may interact and control the operation of script translation module 36, script processing module 38, and frame generating module 40 through user input device 16 and a graphical user interface within display 14.

Each of the script translation module 36, script processing module 38, and frame generating module 40 and any sub-modules, may comprise an ordered listing of executable instructions for implementing logical functions. When script translation module 36, script processing module 38, and frame generating module 40 and any sub-modules are implemented in software, it should be noted that the system can be stored on any computer-readable medium for use by or in connection with any computer-related system or method. In the context of this document, a computer-readable medium is an electronic, magnetic, optical, or other physical device or means that can contain or store a computer program for use by or in connection with a computer-related system or method. Script translation module 36, script processing module 38, and frame generating module 40 and any sub-modules can be embodied in any computer-readable medium for use by or in connection with an instruction execution system, apparatus, or device, such as a computer-based system, processor-containing system, or other system that can fetch the instructions from the instruction execution system, apparatus, or device and execute the instructions.

In the context of this document, a "computer-readable medium" can be any means that can store, communicate, propagate, or transport the program for use by or in connection with the instruction execution system, apparatus, or device. The computer readable medium can be, for example but not limited to, an electronic, magnetic, optical, electromagnetic, infrared, or semiconductor system, apparatus, device, or propagation medium. More specific examples (a nonexhaustive list) of the computer-readable medium would include the following: an electrical connection (electronic) having one or more wires, a portable computer diskette (magnetic), a random access memory (RAM) (electronic), a read-only memory (ROM) (electronic), an erasable programmable read-only memory (EPROM, EEPROM, or Flash memory) (electronic), an optical fiber (optical), and a portable compact disc read-only memory (CDROM) (optical).

Figure 9:
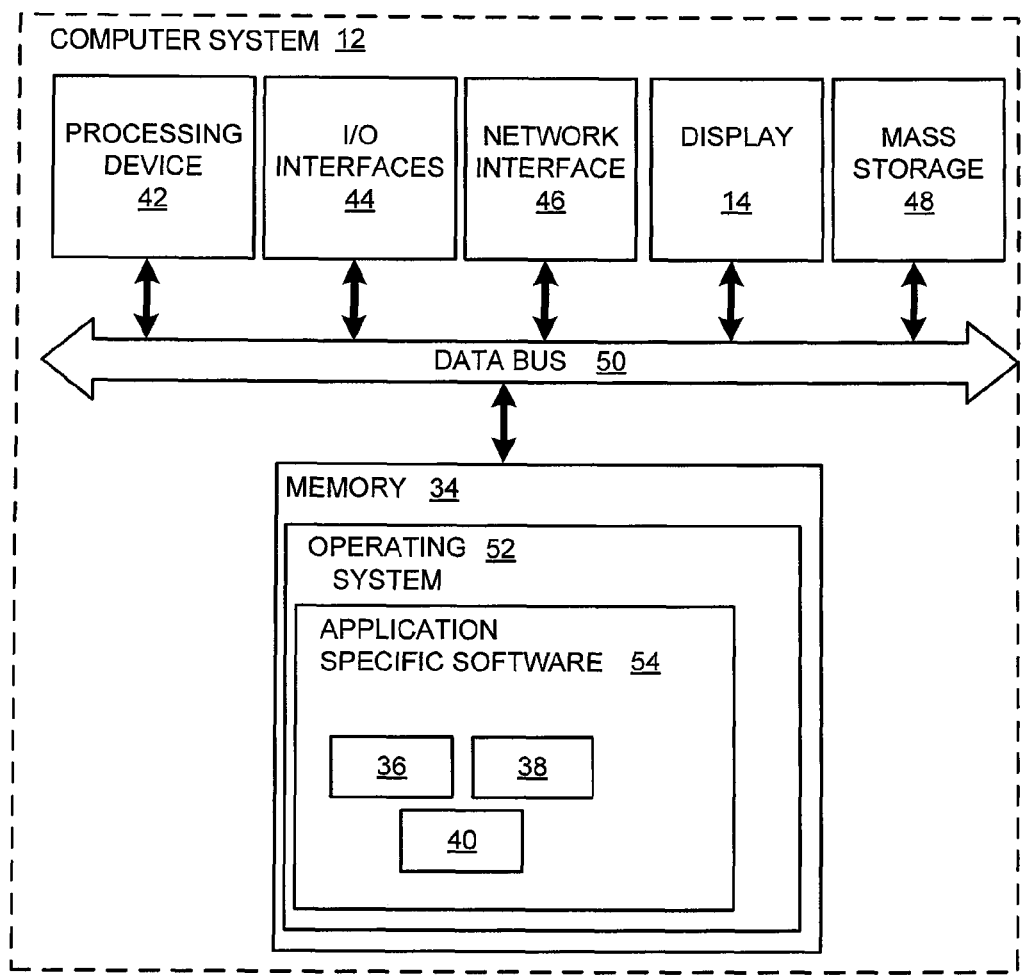
FIG. 9 is a functional block diagram of an alternative embodiment of the disclosure.

FIG. 9 is a block diagram illustrating an exemplary embodiment of computer system 12 on which script translation module 36, script processing module 38, and frame generating module 40 may be executed. Generally speaking, the computer system 12 can comprise any one of a wide variety of wired and/or wireless computing devices, such as a desktop computer, portable computer, dedicated server computer, multiprocessor computing device, cellular telephone, personal digital assistant (PDA), handheld or pen based computer, embedded appliance and so forth. Irrespective of its specific arrangement, computer system 12 can, for instance, comprise memory 34, a processing device 42, a number of input/output interfaces 44, a network interface device 46, and mass storage 48, wherein each of these devices are connected across a data bus 50.

Processing device 42 can include any custom made or commercially available processor, a central processing unit (CPU) or an auxiliary processor among several processors associated with the computer system 12, a semiconductor based microprocessor (in the form of a microchip), a macroprocessor, one or more application specific integrated circuits (ASICs), a plurality of suitably configured digital logic gates, and other well known electrical configurations comprising discrete elements both individually and in various combinations to coordinate the overall operation of the computing system.

The memory 34 can include any one of a combination of volatile memory elements (e.g., random-access memory (RAM, such as DRAM, and SRAM, etc.)) and nonvolatile memory elements (e.g., ROM, hard drive, tape, CDROM, etc.). The memory 34 typically comprises a native operating system 52, one or more native applications, emulation systems, or emulated applications for any of a variety of operating systems and/or emulated hardware platforms, emulated operating systems, etc. For example, the applications may include application specific software 54, which may include any of the script translation module 36, script processing module 38, and frame generating module 40. One of ordinary skill in the art will appreciate that memory 34 can, and typically will, comprise other components which have been omitted for purposes of brevity.

Input/output interfaces 44 provide any number of interfaces for the input and output of data. For example, where the computer system 12 comprises a personal computer, these components may interface with user input device 16, which may be a keyboard or a mouse. Where the computer system 12 comprises a handheld device (e.g., PDA, mobile telephone), these components may interface with function keys or buttons, a touch sensitive screen, a stylist, etc. Display 14 can comprise a computer monitor or a plasma screen for a PC or a liquid crystal display (LCD) on a hand held device, for example.

With further reference to FIG. 9, network interface device 46 comprises various components used to transmit and/or receive data over network 22. By way of example, the network interface device 46 may include a device that can communicate with both inputs and outputs, for instance, a modulator/demodulator (e.g., a modem), wireless (e.g., radio frequency (RF)) transceiver, a telephonic interface, a bridge, a router, network card, etc.)

Accordingly, the above embodiments are merely examples of the many possible ways to perform graphics hardware design debugging and verification. It should be emphasized that many variations and modifications may be made to the above-described embodiments. All such modifications and variations are intended to be included herein within the scope of this disclosure and protected by the following claims.

The invention claimed is:

1. A system for debugging and verifying a graphics hardware design, comprising:
 a script engine configured to interpret a script representing graphics functions into commands;
 a script engine interface configured to translate the commands to a format that can be processed by a device driver;
 a graphics processing unit model corresponding to a hardware design of a graphics processing unit, the graphics processing unit model configured to execute the commands from the device driver and generate at least one graphics frame and debugging information;
 a debugger configured to allow for debugging capabilities of the graphics processing model;
 a reference runtime comprising an application programming interface for graphics operations;
 a reference software driver coupled to the reference runtime and configured to process the commands processed by the reference runtime within the graphics processing unit model, wherein the graphics processing unit model is configured to generate at least one reference driver graphics frame corresponding to graphics functions within the script;

a reference rasterizer, wherein the system is configured to execute the commands within the reference runtime and the reference rasterizer, the reference rasterizer configured to generate at least one reference graphics frame; and wherein the script engine allows a user to compare at least two of: the at least one graphics frame, the at least one reference graphics frame, and the at least one reference driver graphics frame.

2. The system of claim 1, wherein the graphics processing unit model is represented in a programming language.

3. The system of claim 1, wherein the debugger allows a user to perform stepwise execution of the script.

4. The system of claim 3, wherein the debugger allows a user to set at least one debugging breakpoint in the script.

5. The system of claim 3, wherein the debugger allows a user to analyze the generated debugging information.

6. The system of claim 1, further comprising:
a script generator configured to generate the script representing graphics functions from a software application having a graphical component.

7. The system of claim 6, wherein the script generator is configured to capture requests from the software application to perform graphics operations and generate a script including commands for a software graphics driver.

8. A method of debugging and verifying a graphics hardware design, comprising the steps of:
interpreting a script representing graphics functions;
translating the script into commands;
processing the commands within the device driver and a graphics processing unit model representing a graphics hardware design;
processing the commands within a reference runtime and a reference software driver and the graphics processing unit model;
processing the commands within the reference runtime and a reference rasterizer;
generating at least one frame, at least one reference driver frame, and at least one reference frame, all corresponding to the commands within the script;
allowing the comparison of at least two of: the at least one reference frame, the at least one reference driver frame and the at least one frame; and
allowing an analysis based on the result of the comparing step of at least one of: the graphics hardware design and a design of a software graphics driver.

9. The method of claim 8, further comprising the step of: performing stepwise execution of the script.

10. The method of claim 8, further comprising the steps of:
generating debugging information from the graphics processing unit model representing the graphics; and
analyzing the debugging information to verify the graphics hardware design.

11. The method of claim 8, further comprising the steps of:
setting at least one breakpoint in the script;
executing the script to the at least one breakpoint;
analyzing the debugging information; and
resuming execution of the script.

12. The method of claim 8, further comprising the steps of:
generating the script by capturing requests from a software application to perform graphics operations and converting the requests into commands for the software graphics driver.

13. A system for debugging and verifying a graphics hardware design, comprising:
a script engine configured to execute a script comprising commands that represent graphics functions, the script engine configured to execute the commands according to plural execution pathways;
a first of the plural execution pathways comprising a script engine interface, a device driver, and a graphics processing unit module, the first of the plural execution pathways configured to process the commands to generate an image;
a second of the plural execution pathways comprising a reference runtime, a reference software driver, and the graphics processing unit module, the second of the plural execution pathways configured to process the commands to generate a reference driver image; and
a third of the plural execution pathways comprising the reference runtime and a reference rasterizer, the third of the plural execution pathways configured to process the commands to generate a reference image; and
a user interface, wherein the script engine in cooperation with the user interface allows a user to compare at least two of: the image, the reference image, and the reference driver image.

14. The system of claim 13, wherein at least two of the plural execution pathways are executed simultaneously.

15. The system of claim 13, wherein the first of the plural execution pathways is further configured to generate trace information.

16. The system of claim 13, further comprising a debugger configured to cooperate with the script engine and a user interface to allow a user to perform stepwise execution of the script while highlighting a current location in the script during the execution.

17. The system of claim 13, further comprising a debugger configured to cooperate with a user interface to allow a user to place or set breakpoints within the script, present trace information generated by the graphics processing unit model to the user, or a combination of both.

* * * * *